United States Patent
Nainar et al.

(10) Patent No.: US 9,537,712 B2
(45) Date of Patent: *Jan. 3, 2017

(54) DETECTING FAILURES OF BACKUP LABEL SWITCHED PATHS IN A NETWORK ENVIRONMENT

(71) Applicant: CISCO TECHNOLOGY INC., San Jose, CA (US)

(72) Inventors: Nagendra Kumar Nainar, Karnataka (IN); Rajiv Asati, Morrisville, NC (US); Carlos M. Pignataro, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 14/600,068

(22) Filed: Jan. 20, 2015

(65) Prior Publication Data

US 2015/0138947 A1 May 21, 2015

Related U.S. Application Data

(63) Continuation of application No. 13/739,882, filed on Jan. 11, 2013, now Pat. No. 8,964,570.

(51) Int. Cl.
| | |
|---|---|
| *H04L 1/00* | (2006.01) |
| *H04L 12/24* | (2006.01) |
| *H04L 12/703* | (2013.01) |
| *H04L 12/723* | (2013.01) |
| *H04L 12/701* | (2013.01) |
| *H04L 12/707* | (2013.01) |

(52) U.S. Cl.
CPC ........... *H04L 41/0668* (2013.01); *H04L 45/00* (2013.01); *H04L 45/22* (2013.01); *H04L 45/28* (2013.01); *H04L 45/50* (2013.01)

(58) Field of Classification Search
CPC combination set(s) only.
See application file for complete search history.

(56) References Cited

U.S. PATENT DOCUMENTS

| | | | |
|---|---|---|---|
| 7,336,615 B1 | 2/2008 | Pan et al. | |
| 7,463,591 B1 * | 12/2008 | Kompella | H04L 12/2697 370/225 |
| 7,937,492 B1 | 5/2011 | Kompella et al. | |

(Continued)

OTHER PUBLICATIONS

Alia Atlas, "Loop Free Alternates for IPLDP Local Protection," Internet Draft, Internet Engineering Task Force (IETF), Nov. 2004, 23 pages; http://tools.ietf.org/html/draft-atlas-ip-local-protect-loopfree-00.

(Continued)

*Primary Examiner* — Frank Duong
(74) *Attorney, Agent, or Firm* — Patent Capital Group

(57) ABSTRACT

A method is provided in one example and includes communicating a first request message to a first network element functioning as a point of local repair for a backup label switched path. The first request message includes a first network address having a predetermined value and an indication of a forwarding equivalence class associated with the backup label switched path. The method further includes receiving a first reply message from the first network element. The first reply message includes at least one backup path parameter associated with the backup label switched path.

24 Claims, 4 Drawing Sheets

(56) References Cited

U.S. PATENT DOCUMENTS

| | | |
|---|---|---|
| 8,165,032 B1 | 4/2012 | Hanif et al. |
| 2009/0086644 A1 | 4/2009 | Kompella et al. |
| 2013/0121169 A1 | 5/2013 | Zhao et al. |
| 2013/0259056 A1* | 10/2013 | Kotrabasappa ......... H04L 45/24 370/401 |
| 2014/0198634 A1 | 7/2014 | Kumar et al. |

OTHER PUBLICATIONS

Cisco Systems, Inc., "MPLS FAQ for Beginners," Document ID: 4649, Sep. 18, 2008, 6 pages.

Wikipedia, the free encyclopedia, "Multiprotocol Label Switching," Dec. 19, 2002), 8 pages; http://en.wikipedia.org/wiki/Multiprotocol_Label_Switching.

K. Kompella, et al., "Detecting Multi-Protocol Label Switched (MPLS) Data Plane Failures," Network Working Group, RFC 4379, Internet Engineering Task Force (IETF), Feb. 2006, 51 pages; http://tools.ietf.org/html/rfc4379.

N. Bahadur, et al., "Mechanism for Performing Label Switched Path Ping (LSP Ping) over MPLS Tunnels" RFC 4379, Internet Engineering Task Force (IETF), Nov. 2011, 24 pages; http://tools.ietf.org/html/rfc6424.

E. Gray, et al., "Detecting Multi-Protocol Label Switched (MPLS) Data Plane Failures," RFC 6426, Internet Engineering Task Force (IETF), Feb. 2006, 23 pages; http://tools.ietf.org/html/rfc4379.

USPTO Oct. 16, 2014 Notice of Allowance from U.S. Appl. No. 13/739,882.

* cited by examiner

300

| 0 1 2 3 4 5 6 7 8 9 10 11 12 13 14 15 16 17 18 19 20 21 22 23 24 25 26 27 28 29 30 31 |||||
|---|---|---|---|---|
| VERSION NUMBER 302 || GLOBAL FLAGS 304 |||
| MESSAGE TYPE 306 | REPLY MODE 308 | RETURN CODE 310 | RETURN SUBCODE 312 ||
| SENDER'S HANDLE 314 |||||
| SEQUENCE NUMBER 316 |||||
| TIMESTAMP SENT (SECONDS) 318 |||||
| TIMESTAMP SENT (MICROSECONDS) 320 |||||
| TIMESTAMP RECEIVED (SECONDS) 322 |||||
| TIMESTAMP RECEIVED (MICROSECONDS) 324 |||||
| TLVs... 326 |||||

| 0 1 2 3 4 5 6 7 8 9 10 11 12 13 14 15 16 17 18 19 20 21 22 23 24 25 26 27 28 29 30 31 ||
|---|---|
| TYPE 402 | LENGTH 404 |
| VALUE 406 ||

FIG. 4

DETECTING FAILURES OF BACKUP LABEL SWITCHED PATHS IN A NETWORK ENVIRONMENT

CROSS-REFERENCE TO RELATED APPLICATIONS

This Application is a continuation (and claims the benefit of priority under 35 U.S.C. §120) of U.S. application Ser. No. 13/739,882 filed Jan. 11, 2013, entitled "DETECTING FAILURES OF BACKUP LABEL SWITCHED PATHS IN A NETWORK ENVIRONMENT," Inventors Nagendra Kumar, et al. The disclosure of the prior application is considered part of (and is incorporated by reference in) the disclosure of this application.

TECHNICAL FIELD

This disclosure relates in general to the field of communications and, more particularly, to detecting failures of backup label switched paths in a network environment.

BACKGROUND

Multi-Protocol Label Switching (MPLS) is a packet-forwarding technology which directs network traffic from one network node to the next based on short path labels rather than long network addresses. With MPLS, Layer 3 header analysis is done just once when the packet enters the MPLS domain. Label inspection drives subsequent packet forwarding. MPLS decreases the forwarding overhead on core routers and are applicable to any network layer protocol. Label Distribution Protocol (LDP) is a set of procedures by which Label Switching Routers (LSRs) distribute labels to support Multi-Protocol Label Switching (MPLS) forwarding of traffic along routing paths. Label Switched Paths (LSPs) are established to carry traffic that is identified by its Forwarding Equivalence Class (FEC). A label is a locally-significant identifier that is used to identify an FEC. An FEC is a group of packets, such as Internet Protocol (IP) packets that are forwarded in the same manner, over the same path, and with the same forwarding treatment. An FEC might correspond to a destination IP subnet, but it also might correspond to any traffic class that an edge LSR considers significant. For example, all traffic with a certain value of IP precedence might constitute an FEC. Typically, there can be at least one primary LSP path through the MPLS network and traffic can take this primary path during normal operation. Often, there can also be a backup LSP path established through the network that is used to forward traffic in the event that a link or network node in the primary path fails. However, testing the health of the backup LSP path is challenging.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 is a simplified diagram illustrating a Multi-Protocol Label Switching (MPLS) ECHO packet format in accordance with an embodiment of the present disclosure;

FIG. 4 is a simplified diagram illustrating a Type-Length-Value (TLV) format for an MPLS echo packet in accordance with an embodiment of the present disclosure;

DETAILED DESCRIPTION OF EXAMPLE EMBODIMENTS

Overview

A method is provided in one example and can include communicating a first request message to a first network element functioning as a point of local repair for a backup label switched path. The first request message can include a first network address having a predetermined value and an indication of a forwarding equivalence class associated with the backup label switched path. The method can further include receiving a first reply message from the first network element. The first reply message can include at least one backup path parameter associated with the backup label switched path.

Example Embodiments

The following description is presented to enable one of ordinary skill in the art to make and use the embodiments. Descriptions of specific embodiments and applications are provided only as examples and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, features relating to technical material that is known in the technical fields related to the embodiments have not been described in detail.

Figure 1:
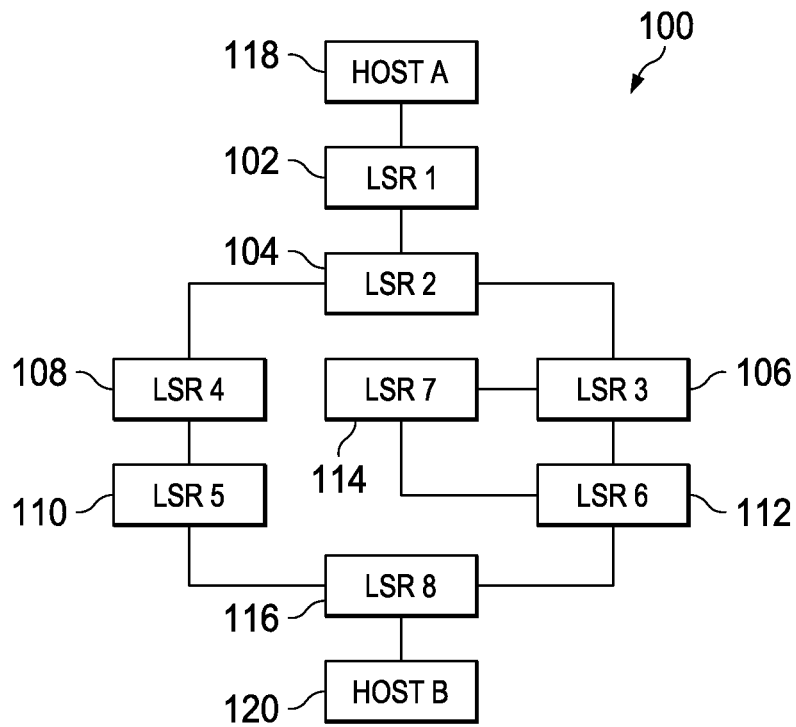
FIG. 1 is a simplified block diagram of a communication system for testing the health of backup label switched paths in a network environment in accordance with one example embodiment of the present disclosure.

Referring now to FIG. 1, FIG. 1 is a simplified block diagram of a communication system 100 for testing the health of backup label switched paths in a network environment in accordance with one embodiment of the present disclosure. Communication system 100 can include a first label switch router (LSR1) 102, a second label switched router (LSR2) 104, a third label switched router (LSR3) 106, a fourth label switched router (LSR4) 108, a fifth label switched router (LSR5) 110, a sixth label switched router (LSR6) 112, a seventh label switched router (LSR7) 114 and an eighth label switched router (LSR8) 116. LSR1 102 is connected to LSR2 104, and LSR2 104 is further connected to LSR3 106 and LSR4 108. LSR3 106 is further connected to LSR6 112 and LSR7 114, and LSR7 is further connected to LSR6 112. LSR4 108 is further connected to LSR5 110, and LSR5 is further connected to LSR8 116. Communication system 100 may further include a host A 118 in communication LSR1 102 and a host B 120 in communication with LSR8 116.

In the embodiment illustrated in FIG. 1, LSR1 102 is functioning as an ingress LSR for packets entering the MPLS network from host A 118, and LSR8 116 is functioning as an egress LSR for packets leaving the MPLS network to host A 120. In the particular embodiment illustrated in FIG. 1 a primary LSP has been established through the MPLS network in which packets flow from LSR1 102 to LSR2 104 to LSR3 106 to LSR6 112 to LSR8 116. In accordance with a loop free alternate (LFA) procedure, a backup path for one or more LSRs is established. One goal in LFA is to determine an alternate path for traffic from an LSR that does not loop back through the LSR itself. In the particular embodiment illustrated in FIG. 1, LSR2 104 has a backup LSP via LSR4 108 to reach LSR 116 in the event that there is a failure of LSR3 106 or a failure in the link between LSR2 104 and LSR3 106. In this case, traffic from host A 118 to host B 120 would flow through LSR1 102, LSR2 104, LSR4, 108, LSR5 110, and LSR8 116. Further, LSR3 has a backup LSP via LSR7 114 to reach LSR8 116 in the event that the link between LSR3 106 and LSR6 1121 fails.

The procedures to setup these backup LSPs are outside the scope of the embodiments described herein, but it should be understood that in various embodiments these backup paths may be created using, for example, RSVP-TE (Resource ReSerVation Protocol-Traffic Engineering) P2P (Point-to-Point) LSP (Label Switched Path), LDP LFA (Loop Free Alternate) based techniques or any other suitable technique.

A Point of Local Repair (PLR) is an LSR that redirects traffic to one or more Merge Point (MPT) LSRs in order to bypass a failed node or link in a network. A Merge Point (MPT) is an LSR that merges the backup LSP with the primary LSP after a node or link fails. A particular LSR may become a PLR or MPT based on its position in the network relative to the node protected by the backup LSR. A node can be a PLR for one LSP and a MPT for another. This is a dynamic process. Thus, a particular node may be configured to act as a PLR or MPT depending upon the role that it currently needs to perform. It should be noted that there may also be multiple MPT LSRs for a single protected node. In the particular embodiment illustrated in FIG. 1, LSR2 104 is functioning as a PLR for the backup LSP from LSR2 104 to LSR4 108 to LSR5 110 to LSR8 116. In addition, LSR3 106 is functioning as a PLR for the backup LSP from LSR3 106 to LSR7 114 to LSR6 112 to LSR8 116.

In one particular instance, communication system 100 can be associated with a service provider digital subscriber line (DSL) deployment. In other examples, communication system 100 would be equally applicable to other communication environments, such as an enterprise wide area network (WAN) deployment, cable scenarios, broadband generally, fixed wireless instances, fiber to the x (FTTx), which is a generic term for any broadband network architecture that uses optical fiber in last-mile architectures. Communication system 100 may include a configuration capable of transmission control protocol/internet protocol (TCP/IP) communications for the transmission and/or reception of packets in a network. Communication system 100 may also operate in conjunction with a user datagram protocol/IP (UDP/IP) or any other suitable protocol, where appropriate and based on particular needs.

In view of the importance of the proper functioning of the backup paths in the network, it is desirable to have the capability of verifying the backup label switched paths to ensure the health of the backup label switched path. This backup LSP may be broken or inoperable for many reasons and currently there is no simple way to check the backup LSP health. One procedure to check the backup LSP health would be to login to each LSR along the backup path and check hardware and software entries within the LSR to confirm proper operation. For example, in communication system 100 using such a procedure would require separately logging into to LSR2 104, LSR4 108, LSR5 110, and LSR8 116 in order to check the health of the backup LSP from LSR2 104 to LSR4 108 to LSR5 110 to LSR8 116. However, such a procedure would require extensive manual intervention by a user. Another procedure to check the backup LSP health would be to introduce a new command line interface (CLI) to check the backup LSP health from each PLR (LSR2 104 and LSR3 106 in FIG. 1). However, this procedure again requires manual intervention to identify the PLR, login to the PLR, and then trigger a test.

In accordance with various embodiments described herein, procedures are provided for detecting failures of backup label switched paths in a network environment. In at least one embodiment, the identity of the PLR for the backup path and backup path details associated with the PLR is determined, and these backup path details are used to test or verify the health of the backup LSP for the PLR and/or perform a trace of the route of the backup LSP using the backup path details to detect failures in the backup label switched paths as will be described in more detail herein.

The embodiments described herein operate in the context of a data communication network including multiple network elements. LSR1 102, LSR2 104, LSR3 106, LSR4 108, LSR5 110, LSR6 112, LSR7, 114, and LSR8 116 are network elements that facilitate flows between hosts and/or sources in a given network. As used herein in this Specification, the term 'network element' is meant to encompass routers, switches, gateways, bridges, loadbalancers, firewalls, inline service nodes, proxies, servers, processors, modules, or any other suitable device, component, element, proprietary appliance, or object operable to exchange information in a network environment. This network element may include any suitable hardware, software, components, modules, interfaces, or objects that facilitate the operations thereof. This may be inclusive of appropriate algorithms and communication protocols that allow for the effective exchange of data or information. As used herein the term router is used to refer to devices that forward packets based on network and higher layer information. The router may include, for example, a master central processing unit (CPU), interfaces, and a bus (e.g., a PCI bus). When acting under the control of appropriate software or firmware, the CPU is responsible for such router tasks as routing table computations, network management, and general processing of packets. It preferably accomplishes all of these functions under the control of software including an operating system and any appropriate application software.

In one implementation, the LSR1 102, LSR2 104, LSR3 106, LSR4 108, LSR5 110, LSR6 112, LSR7, 114, and LSR8 116 include software to achieve (or to foster) the testing of the health of backup label switched paths procedures, as outlined herein in this Specification. Note that in one example, each of these elements can have an internal structure (e.g., a processor, a memory element, etc.) to facilitate some of the operations described herein. In other embodiments, these node protection procedures may be executed externally to these elements, or included in some other network element to achieve this intended functionality. Alternatively, LSR1 102, LSR2 104, LSR3 106, LSR4 108, LSR5 110, LSR6 112, LSR7, 114, and LSR8 116 may include this software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

Figure 2:
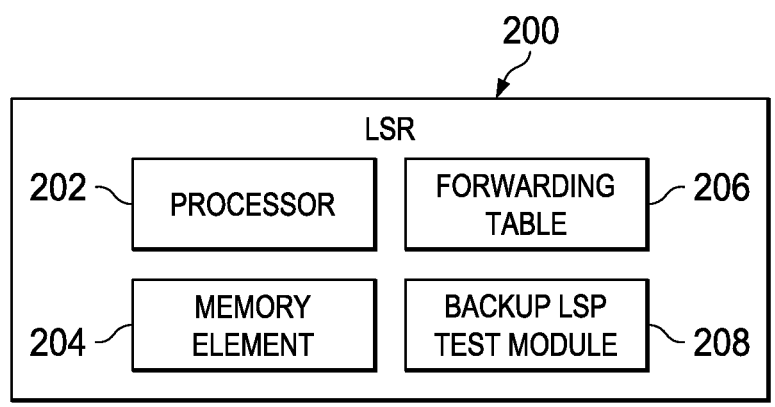
FIG. 2 illustrates a simplified block diagram of an example embodiment of a label switched router (LSR)

FIG. 2 illustrates a simplified block diagram of an example embodiment of a label switched router (LSR) 200. In various embodiments, LSR 200 may include any one or more of LSR1 102, LSR2 104, LSR3 106, LSR4 108, LSR5 110, LSR6 112, LSR7, 114, and LSR8 116 of FIG. 1. LSR 200 can include a processor 202, a memory element 204, a forwarding table 206, and a backup LSP test module 208. Processor 202 is configured to execute instructions associated with the operations of LSR 200. Memory element 114 can store any appropriate information (e.g., routing tables, entries, network configurations, policies, forwarding trees, etc.). Forwarding table 206 is configured to store information regarding one or more network elements to which traffic should be forwarded in communication network 100. Backup LSP test module 208 is configured to perform the procedures for the testing of the health of backup label switched paths as further described herein.

Identifying the PLR with the Backup LSP

Referring again to FIG. 1, in accordance with one embodiment, an initiator that is testing the health of a backup LSP sends a request to identify the PLR of the backup LSP and obtain backup path details associated with the backup LSP from the PLR. The initiator may include a management router or management server of the MPLS network tasked with testing the backup LSP health of the MPLS network. Referring again to the embodiment illustrated in FIG. 1, LSR1 102 may function as an initiator for testing the backup LSP from LSR2 104. In a particular embodiment, LSR1 102 generates an MPLS ECHO packet such as specified in RFC 4379 and RFC 6424. The MPLS ECHO packet can include a specific sub-Type-Length-Value (sub-TLV) indicating that the MPLS ECHO is a backup path request (BACKUP-PATH REQUEST) message. In at least one embodiment, the BACKUP-PATH REQUEST sub-TLV can include a PLR address field and a Target-FEC field. In a particular embodiment, the BACKUP-PATH request sub-TLV is located in a Downstream Detailed Mapping (DDMAP) TLV of the ECHO REQUEST. The PLR address field indicates the PLR address of the PLR from which the BACKUP-PATH is requested and the target-FEC field indicates the FEC of the backup LSP being tested. The PLR address field may include a generic value indicative of a Generic PLR request or a specific IP address of the PLR indicative of a Specific PLR request. In a particular embodiment, the PLR Address field in the BACKUP-PATH REQUEST is all zero in value if it is Generic PLR request and has a value of an IPv4 or IPv6 address if it is Specific PLR Request. If the Initiator is generating a Generic PLR MPLS ECHO REQUEST, the label stack in this packet should be the label for the Target-FEC in the forwarding table and should start with Time-To-Live (TTL) value=1. The initiator should send the Generic PLR MPLS ECHO REQUEST until it reaches the Egress LSR for the Target FEC. If the Initiator is generating a Specific PLR MPLS ECHO REQUEST, the label stack should be the label to reach the PLR address.

An LSR, upon receiving a Generic PLR request, can check for any backup path for the Target FEC indicated in the received request. A, LSR, upon receiving a Specific PLR Request can reply back with a backup path reply message only if the PLR Address its own address. Otherwise, the LSR can ignore the BACKUP-PATH sub-TLV in the MPLS ECHO REQUEST. In a particular embodiment, the backup path reply message is an MPLS ECHO replay message with a BACKUP-PATH REPLY sub-TLV in the DDMAP indicating that the MPLS ECHO is a backup path replay message. In at least one embodiment, the BACKUP-PATH REPLY sub-TLV can include a Backup Downstream Address (BDA) field, a PLR Address field, a Backup Path Label (BPL) field, and a Backup LSR Label (BLL) field. The Backup Downstream Address (BDA) field carries any address (such as a LDP Router ID) of the backup downstream router that is the router downstream of the PLR along the backup LSP. The PLR Address Field carries a local reachable address of the PLR. The Backup Path Label (BPL) field carries the backup label that the PLR can use for the FEC in case of primary failure. The Backup LSR Label (BLL) field carries the local label assigned and advertised by the PLR for the Backup Downstream Address.

In the embodiment illustrated in FIG. 1, LSR1 102 sends a MPLS ECHO packet and populates the MPLS ECHO packet with the PLR address of LSR2 104, an FEC value indicating a particular FEC, and a TTL=1. The use of a TTL=1 is to identify the PLR. In a situation in which an operator does not know the PLRs along a primary path for a specific Target-FEC, the operator may send the MPLS ECHO REQUEST from LSR1 102 with a BACKUP-PATH REQUEST sub-TLV starting with TTL=1. In this case, the PLR address with an all-zero value is used. However, if the initiator is already aware of the PLR address, such as by using an offline tool or other procedure, there is no need to start from TTL=1. When the packet reaches LSR2 104, LSR2 104 can look into the payload of the MPLS ECHO packet and determine by the backup path sub-TLV that the packet is a request for information regarding any backup path installed or populated for this particular FEC. In this case, from LSR2 104 the primary path can be towards LSR3 106 and the backup path can be toward LSR4 108. LSR2 104 can reply back with the backup path details of LSR4 108 in a "BACKUP-PATH" TLV. In the particular illustrated embodiment, the Backup Downstream Address (BDA) field value is the router ID (LSR ID) of LSR4 108, and the PLR address field value is the local reachable address on LSR2 104 (which is the PLR). The Backup Path Label (BPL) field value is the backup label which LSR2 104 can use for this particular FEC in case the link between LSR2 104 and LSR3 106 (the primary link) goes down, that is the label that can be used when LSR2 104 uses the backup path including LSR2 104, LSR4 108, LSR5 110, and LSR8 116. The Backup LSR Label (BLL) field-value is the label locally assigned by LSR2 104 for any of the addresses on LSR4 108.

In particular embodiments, if the LSR does not have a backup path for the received Target FEC, the LSR can reply with an MPLS ECHO REPLY without a BACKUP-PATH REPLY sub-TLV. Any LSR that does not understand the BACKUP-PATH sub-TLV may reply with a return code as 2 per RFC 4379 indicating that one or more TLVs was not understood. The initiator upon receiving the MPLS ECHO REPLY with return code as 2 should mark the replying LSR as "unsupported", and in some embodiment may further trigger a system log informational message indicating that the LSR is unsupported. Upon the initiator receiving an MPLS ECHO REPLY with a return code set as 8 with no BACKUP-PATH REPLY sub-TLV can consider the replying LSR as a non-PLR. In other words, the replying LSR does not have a backup path for the Target FEC. Upon the initiator receiving the MPLS ECHO REPLY with a return code set as 8 with a BACKUP-PATH REPLY sub-TLV should populate a temporary local PLR table with details from the received BACKUP-PATH sub-TLV. Upon the initiator receiving an MPLS ECHO REPLY with a return code set as 10 with a BACKUP-PATH REPLY sub-TLV should populate the local PLR table with details from the received BACKUP-PATH REPLY sub-TLV. However, in various embodiments, the initiator does not originate or send out any BACKUP-PATH REPLY TLVs.

FIG. 3 is a simplified diagram illustrating an MPLS ECHO packet format 300 in accordance with an embodiment of the present disclosure. Packet format 300 can include a version number field 302, a global flags field, 304, a message type field 306, a reply mode field 308, a return code field 310, a return subcode field 312, a sender's handle field 314, a sequence number field 316, a timestamp sent (seconds) field, 318, a timestamp sent (microseconds) field 320, a timestamp received (seconds) field 322, a timestamp received (microseconds) field 324, and a TLV(s) field 326.

The version number field 302 is typically set to a value of 1 and may be incremented whenever a change is made that affects the ability of an implementation to correctly parse or process an MPLS echo request/reply. These changes include any syntactic or semantic changes made to any of the fixed fields, or to any TLV or sub-TLV assignment or format that is defined at a certain version number. However, the version number may not need to be changed if an optional TLV or sub-TLV is added. The global flags field 304 is a bit vector having a Validate FEC Flag which is set to 1 if the sender wants the receiver to perform FEC Stack validation, and set to 0 if the choice is to be left to the receiver. The message type flag is set to 1 if the MPLS ECHO message is a MPLS echo request and is set to 2 if the MPLS echo message is a MPLS echo reply. The reply mode field 308 may be set to a value=1 for do not reply, a value=2 for reply via an IPv4/IPv6 UDP packet, a value=3 for a reply via an IPv4/IPv6 UDP packet with Router Alert, and a value=4 for reply via application level control channel.

Return code field 310 is set to zero by the sender. The receiver can set the value of return code field 310 to one of the values listed below. The notation <RSC> refers to the return subcode field 312. The return subcode field 312 is filled in with the stack-depth for those codes that specify such. For all other codes, the return subcode field 312 is set to zero.

| Value | Meaning |
| --- | --- |
| 0 | No return code |
| 1 | Malformed echo request received |
| 2 | One or more of the TLVs was not understood |
| 3 | Replying router is an egress for the FEC at stack-depth <RSC> |
| 4 | Replying router has no mapping for the FEC at stack-depth <RSC> |
| 5 | Downstream Mapping Mismatch |
| 6 | Upstream Interface Index Unknown |
| 7 | Reserved |
| 8 | Label switched at stack-depth <RSC> |
| 9 | Label switched but no MPLS forwarding at stack-depth <RSC> |
| 10 | Mapping for this FEC is not the given label at stack-depth <RSC> |
| 11 | No label entry at stack-depth <RSC> |
| 12 | Protocol not associated with interface at FEC stack-depth <RSC> |
| 13 | Premature termination of ping due to label stack shrinking to a single label |

-continued

| Value | Meaning |
| --- | --- |
| 14 | See DDM TLV for Return Code and Return Subcode |
| 15 | Label switched with FEC change |

Sender's handle field 314 is filled in by the sender, and returned unchanged by the receiver in the echo reply (if any). Sequence number field 316 is assigned by the sender of the MPLS echo request and can be (for example) used to detect missed replies. The value of timestamp sent field 318 and timestamp sent field 320 is the time-of-day (in seconds and microseconds according to the sender's clock) in Network Time Protocol (NTP) format when the MPLS echo request is sent. The value of timestamp received field 322 and timestamp received field 322 in an echo reply is the time-of-day (in seconds and microseconds according to the receiver's clock) in NTP format that the corresponding echo request was received. TLV(s) field 326 can include one or more TLVs or sub-TLVs within.

FIG. 4 is a simplified diagram illustrating a Type-Length-Value (TLV) format 400 for an MPLS echo packet in accordance with an embodiment of the present disclosure. TLV format 400 can include a type field 402, a length field 404, and a value field 406. The type field 402 indicates a type as further defined below, the value of length field 404 is the length of the value field 406 in octets. The value field 406 depends upon the type indicated by type field 402 and may be zero padded to align to a 4-octet boundary. Value field 406 can include one or more TLVs. TLVs may be nested within other TLVs in which case the nested TLVs are called sub-TLVs. Sub-TLVs have independent types and may also be 4-octet aligned.

An example description of Types and Values of the top-level TLVs for LSP ping are given as follows:

| Type # | Value Field |
| --- | --- |
| 1 | Target FEC Stack |
| 2 | Downstream Mapping |
| 3 | Pad |
| 4 | Not Assigned |
| 5 | Vendor Enterprise Number |
| 6 | Not Assigned |
| 7 | Interface and Label Stack |
| 8 | Not Assigned |
| 9 | Errored TLVs |
| 10 | Reply TOS Byte |

In a particular embodiment, types less than 32768 (i.e., with the high-order bit equal to 0) are mandatory TLVs that should either be supported by an implementation or result in the return code of 2 ("One or more of the TLVs was not understood") being sent in the echo response. Types greater than or equal to 32768 (i.e., with the high-order bit equal to 1) are optional TLVs that should be ignored if the implementation does not understand or support them.

In accordance with various embodiments, value field 406 may include either a BACKUP-PATH REQUEST sub-TLV or a BACKUP-PATH reply TLV as discussed herein. Particular example formats of the BACKUP-PATH REQUEST sub-TLV and the BACKUP-PATH reply TLV are further discussed with respect to FIG. 5 and FIG. 6, respectively.

Figure 5:
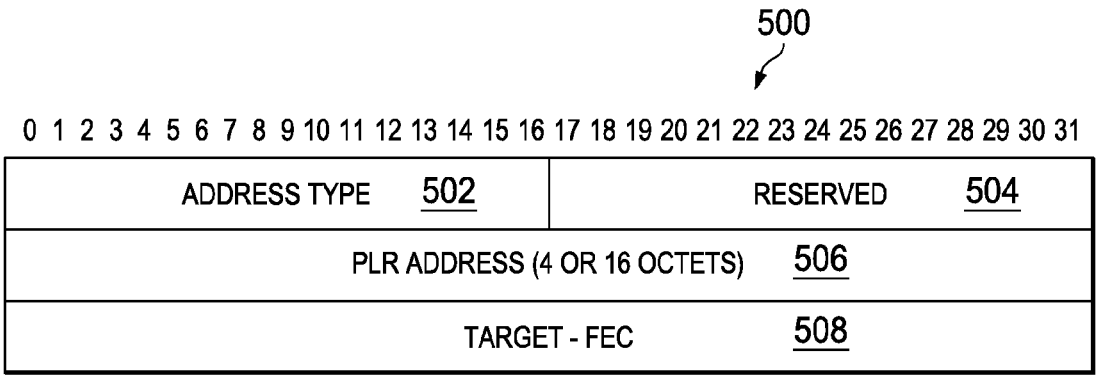
FIG. 5 is a simplified diagram illustrating an example BACKUP-PATH REQUEST sub-TLV format in accordance with an embodiment of the present disclosure.

FIG. 5 is a simplified diagram illustrating an example BACKUP-PATH REQUEST sub-TLV format 500 in accordance with an embodiment of the present disclosure. BACKUP-PATH REQUEST sub-TLV format 500 can include an address type field 502, a reserved field 504, a PLR Address field 506, and a Target-FEC field 508. Address type field 502 indicates whether the PLR address in the PLR address field 506 is an IPv4 address or an IPv6 address. Reserved field 504 is a reserved field. PLR address field 506 can include an address (e.g., either 4 or 16 octets) associated with a PLR and depending upon its value is interpreted as either a Generic PLR request or a specific PLR request. As previously discussed, when PLR address field 506 is set to an all zero value, the receiver can interpret it as a Generic PLR Request. When PLR address field 506 is a non-zero value, the receiver can interpret it as a PLR request for the specific PLR identified by the PLR address. As previously discussed, the BACKUP-PATH REQUEST sub-TLV may be sent in an MPLS ECHO REQUEST packet from an initiator to a particular LSR.

Figure 6:
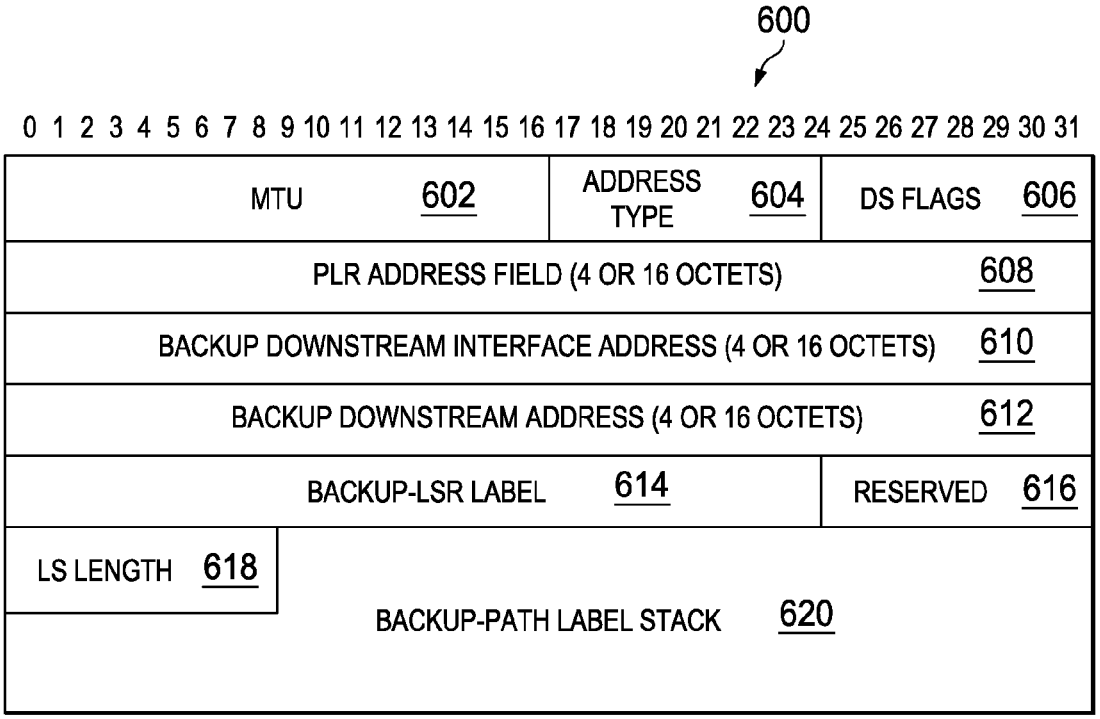
FIG. 6 is a simplified diagram illustrating an example BACKUP-PATH REPLY sub-TLV format in accordance with an embodiment of the present disclosure.

FIG. 6 is a simplified diagram illustrating an example BACKUP-PATH REPLY sub-TLV format 600 in accordance with an embodiment of the present disclosure. BACKUP-PATH REPLY sub-TLV format 600 can include an MTU field 602, an address type field 604, a DS flags field 606, a PLR address field 608, a backup downstream interface address field 610, a backup downstream address field 612, a backup-LSR label 614, a reserved field 616, an LS Length field 618, and a backup-path label stack field 620.

MTU field 602 indicates a maximum transmission unit (MTU) size on the egress interface to the Backup Downstream LSR. Address type field 604 indicates the address type (either IPv4 or IPv6) of the PLR address. DS flags field 606 can include one or more flags such as an Interface and Label Stack Object Request flag which when set indicate that the replying router SHOULD include an Interface and Label Stack Object in an echo reply message, and a Treat as a Non-IP Packet flag which is used when diagnosing non-IP flows. PLR address field 608 can include a local IPv4 or IPv6 address of the LSR that is originating the MPLS ECHO REPLY. Backup downstream interface address field 610 can include an IPv4 or IPv6 address on the interface towards the backup downstream LSR, and backup downstream address 612 can include an IPv4 or IPv6 address of the backup downstream LSR. Backup-LSR label field 614 can include a local label assigned by the PLR to the transport address of the backup downstream LSR. If the transport address has a NULL label, it should prefer any other address for which the local assigned label is non-NULL value. Backup-path label stack 620 can include backup label(s) the PLR can use in case of primary path failure.

Figure 7:
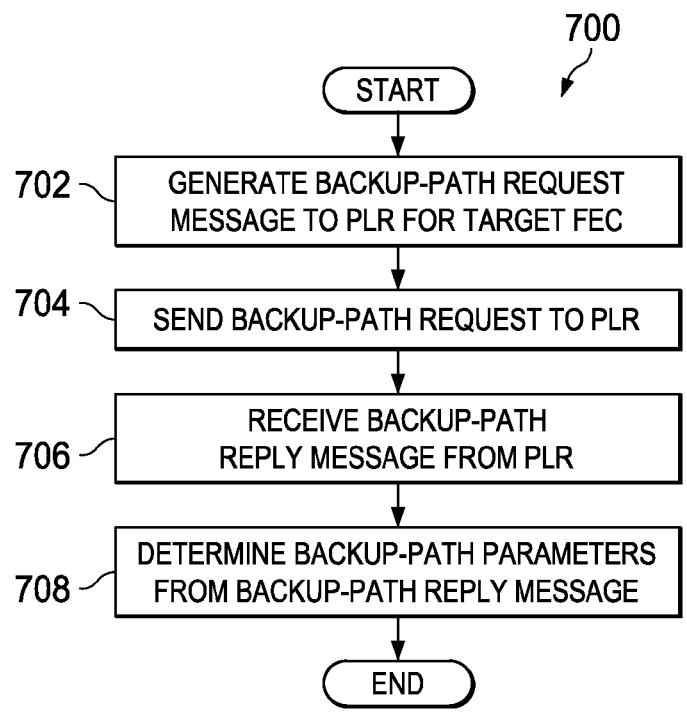
FIG. 7 is a simplified flowchart illustrating a procedure for identifying a Point of Local Repair (PLR) with a backup label switched path (LSP) in accordance with an embodiment of the present disclosure.

FIG. 7 is a simplified flowchart 700 illustrating a procedure for identifying a Point of Local Repair (PLR) with a backup label switched path (LSP) in accordance with an embodiment of the present disclosure. In 702, an initiator generates a backup-path request message to a PLR for a particular target FEC. In a particular embodiment, the backup-path request message is an MPLS ECHO REQUEST with a BACKUP-PATH REQUEST sub-TLV having a PLR address field identifying either a specific PLR for a specific PLR request, or indicating a generic PLR request as described herein. In 704, the initiator sends the backup-path request to the PLR indicated in the PLR address field for the indicated FEC. In 706, the initiator receives a backup-path reply message from the PLR including backup path parameters associated with the backup path that may be used in assessing the health of the backup path. In a particular embodiment, the backup-path replay message can include is an MPLS ECHO REPLY message including a BACKUP-PATH REPLY sub-TLV. The BACKUP-PATH Reply carries backup path parameters including a backup downstream address (BDA), a PLR address, a backup path label (BPL), and a backup LSR label (BLL).

In 708, the initiator determines the backup path parameters, such as the backup downstream address (BDA), the PLR address, the backup path label (BPL), and the backup LSR label (BLL), from the backup-path reply message. The flow then ends. The initiator can now have the list of PLR details along with backup downstream LSR and the backup label details. Once the PLR and the associated backup path parameters and/or details are identified by the initiator, backup path information can be used to test the health of the backup label switched paths such as by either tracing or testing the health of the backup LSP as can be further described herein.

Testing the Health of Backup LSPs

In order to test the health of a backup LSP, the initiator generates an MPLS ECHO request packet for a specific PLR and FEC that does not include the aforedescribed BACKUP-PATH sub-TLV. The MPLS echo request packet has a label stacking in the header including information obtained by the initiator during the identifying of the PLR. In at least one embodiment, the label stack can include the information obtained from the identified PLR with a backup LSP as follows: the BACKUP-PATH Label (BPL) is the bottom label in the label stack with a bottom of stack (BOS) value=1 indicating the BPL is at the bottom of the label stack and with a TTL=255; the BACKUP-LSR Label (BLL) is in the middle of the label stack with TTL=255; and the PLR Address Label is the top label in the label stack with TTL=255. In a particular embodiment, the MPLS echo request packet can include a destination IP address of 127.0.0.x for IPv4 or 0:0:0:0:0:FFFF:127.0.0.x for Ipv6. Referring again to FIG. 1, LSR1 102 functioning as the initiator generates and sends the MPLS ECHO request packet containing the abovedescribed label stack to LSR2 104. In the embodiment illustrated in FIG. 1, since LSR1 102 and LSR2 104 are directly connected, the top label is NULL and thus only two labels can be sent which can include the BPL as the bottom label and the BLL as the top label.

Upon receiving the MPLS ECHO request, LSR2 104 pops the top label, which is the BLL assigned by LSR2 104 for addresses on LSR4 108 and sends an MPLS ECHO message including the BPL to LSR4 108. The MPLS ECHO REQUEST reaches LSR8 116, and LSR8 116 as the egress router replies with an MPLS ECHO REPLY packet to LSR1 102 including an indication of the health of the backup LSP. LSR4 108 upon receiving the BPL can further send the BPL to LSR5 110, and LSR5 can send the BPL to LSR8 116. In this manner, the backup LSP health is determined by verifying the backup path from LSR1 102 to LSR2 104 to LSR4 108 to LSR5 110 to LSR8 116 to detect failures in the backup path. Accordingly, during testing of the health of the backup LSP via LSP ping, the egress network element (LSR) can respond with the indication of the health of the LSP.

Tracing the Route of the Backup LSP

In order to trace the route of the backup LSP, in a similar manner to testing the health of a backup LSP, the initiator generates an MPLS ECHO request packet for a specified PLR and FEC that does not include the aforedescribed BACKUP-PATH sub-TLV. In at least one embodiment, the MPLS echo request packet has a label stack that can include the information obtained from the identified PLR with a backup LSP as follows: the BACKUP-PATH Label (BPL) is the bottom label in the label stack with a bottom of stack (BOS) value=1 indicating the BPL is at the bottom of the label stack and with an initial TTL=1; the BACKUP-LSR Label (BLL) is in the middle of the label stack with TTL=255; and the PLR Address Label is the top label in the label stack with TTL=255. During tracing of the backup LSP route, the BPL TTL value is incremented by one for each subsequent LSR along the backup LSP path. The initiator on sending the first MPLS ECHO REQUEST uses the details received the BACKUP-PATH sub-TLV to populate the DDMAP. Any subsequent MPLS ECHO REQUEST sent by the initiator copies the DDMAP details from the received MPLS ECHO REPLY. The initiator can continue to send an MPLS ECHO REQUEST with TTL increasing on the BACKUP-PATH Label until it receives an MPLS ECHO REPLY with a response from an LSR that can include an indication that the LSR is an egress router for the particular FEC. In a particular embodiment, the indication that the LSR is an egress router for the particular FEC can include an MPLS ECHO REPLY having a return code=3. Referring again to FIG. 1, in order to trace the route of the backup LSP LSR1 102 functioning as the initiator generates and sends a MPLS ECHO REQUEST packet containing the abovedescribed label stack having a BPL with a TTL=1 to LSR2 104 (which is the PLR for the backup LSP).

When LSR2 104 pops the label stack, LSR2 can send the BPL to LSR4 108. LSR2 104 further verifies the health of the backup LSP indicated by the BACKUP-PATH Label and sends an MPLS ECHO REPLY packet to LSR1 102 including an indication of the health of the backup LSP at LSR4 108. A second MPLS ECHO REQUEST is sent from LSR1 102 having a BPL TTL=2. Accordingly, the second MPLS ECHO REQUEST can reach LSR5 110 and the health of the backup LSP at LSR5 110 is reported to LSR1 102 in an MPLS ECHO REPLY. A third MPLS ECHO REQUEST is sent from LSR1 104 having a BPL TTL=3. Accordingly, the third MPLS ECHO REQUEST can reach LSR8 120 and the health of the backup LSP at LSR8 116 is reported to LSR1 102 in an MPLS ECHO REPLY. Accordingly, during tracing of the backup path, each backup downstream network element (LSR) may send an MPLS ECHO reply packet to LSR1 102 indicating the health of the backup LSP.

Figure 8:
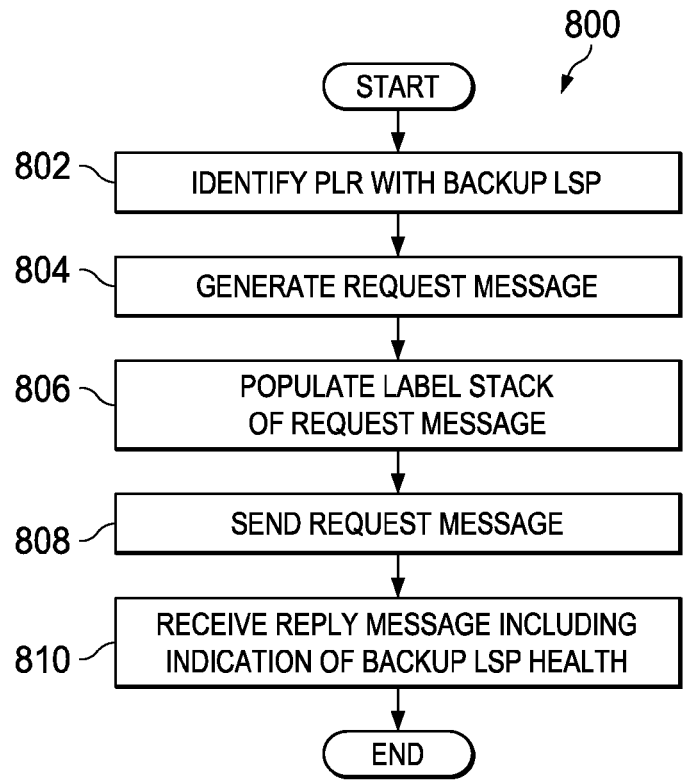
FIG. 8 is a simplified flowchart illustrating an example procedure for testing the health of a backup LSP and/or tracing a backup LSP in accordance with an embodiment of the present disclosure.

FIG. 8 is a simplified flowchart 800 illustrating a procedure for testing the health of a backup LSP and/or tracing a backup LSP in accordance with an embodiment of the present disclosure. In 802, an initiator identifies a PLR with a backup LSP and obtains backup LSP parameters from the PLR in accordance with one or more of the procedures described above. In a particular embodiment, the backup LSP parameters include one or more of a backup downstream address (BDA) field, a PLR address field, a backup path label (BPL) field, and a backup LSR label (BLL) field. In 804, the initiator generates a request message. In a particular embodiment, the request message is an MPLS ECHO REQUEST. In 806, the initiator populates a label stack of the request message with one or more of the backup LSP parameters obtained from the PLR. In a particular example in which it is desired to test the health of the backup LSP, the label stack of the request message may be populated as follows: the BACKUP-PATH Label (BPL) is the bottom label in the label stack with a bottom of stack (BOS) value=1 indicating the BPL is at the bottom of the label stack and with a TTL=255; the BACKUP-LSR Label (BLL) is in the middle of the label stack with TTL=255; and the PLR Address Label is the top label in the label stack with TTL=255. In another particular example in which it is desired to trace the backup LSP the label stack of the request message may be populated as follows: the BACKUP-PATH Label (BPL) is the bottom label in the label stack with a bottom of stack (BOS) value=1 indicating the BPL is at the bottom of the label stack and with an initial TTL=1; the BACKUP-LSR Label (BLL) is in the middle of the label stack with TTL=255; and the PLR Address Label is the top label in the label stack with TTL=255. In 808, the initiator sends the request message to the PLR or another desired network node.

In 810, the initiator receives a reply message including an indication of the health of the backup LSP from the PLR or another network node. The flow then ends. Certain portions of flowchart 800 may be repeated for subsequent request messages while making appropriate changes to the content of the request message and reply messages depending up whether the operation is a testing of a backup LSP or a tracing of a backup LSP as previously discussed herein. In various embodiments, the procedures of flowchart 800 may be performed at the request of a user and/or automatically at the occurrence of an event in the network, and at a periodic basis.

In accordance with various embodiments, a user interface may be provided to allow a user or system administrator to selectively instruct an initiator to identify a PLR and the associated backup path details, instruct an initiator to test backup LSP from a specific PLR for a Target FEC, and an initiator to test a backup LSP from all PLRs along the path for a Target FEC.

It should be understood that in various embodiments, the principles described herein allow LSRs configured to understand and process the BACKUP-PATH sub-TLV described herein to interoperate with non-compliant routers. In various embodiments, any transit LSR along the backup path that does not understand the BACKUP-PATH sub-TLV can reply back with a response code indicating that one or more of the received TLVs was not understood without breaking the testing of any other supporting LSRs along the path. In a particular embodiment, a non-compliant LSR returns a response code of 2 in accordance with RFC 4379. Return code as 2.

In one or more embodiments, a new error message is not required to implement the procedure described herein as existing error codes are sufficient to identify the health of a backup LSP. In still another embodiment, an enhancement in the scaling of the backup LSP health testing procedures described herein is obtained by localizing some of the validation aspects. Specifically, in a particular embodiment only the LFA at the PLR, instead of (or in addition to) the end-to-end LFA. In still another embodiment, validation is performed locally and LFA for Fast Re-Route (FRR). In still another embodiment, if there are multiple LFAs a tiebreaker procedure may be used. Once those details are known, they can be also used locally to check validity of the segment directly. A combination of both procedures provides for scaling and flexibility. One advantage that may be provided in certain embodiments relates to allowing periodic or on-demand testing of backup paths to confirm that they are working properly.

Note that in certain example implementations, the testing of the health of backup label switched paths functions outlined herein may be implemented by logic encoded in one or more tangible, non-transitory media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 2] can store data used for the operations described herein. This can include the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that can include digital logic, software, code, electronic instructions, or any suitable combination thereof.

In one example implementation, the routers including the LSRs and/or PLRs may include software in order to achieve the backup LSP health testing functions outlined herein. These activities can be facilitated by backup LSP test module 208. The routers can include memory element 204 for storing information to be used in achieving the testing activities, as discussed herein. Additionally, any of the routers may include instances of processor 202 that can execute software or an algorithm to perform the backup LSP health testing functions, as disclosed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, tables, trees, cache, etc.) should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the example provided above, as well as numerous other examples provided herein, interaction may be described in terms of two or more network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the steps in the preceding flow diagrams illustrate only some of the possible signaling scenarios and patterns that may be executed by, or within, communication systems 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain endpoint components and certain protocols, communication system 100 may be applicable to other protocols and arrangements. Moreover, the present disclosure is equally applicable to various technologies, aside from MPLS architectures implementing LFA, as these have only been offered for purposes of discussion. Along similar lines, communication systems 100 can be extended to any Multi-Protocol Label Switching (MPLS) architecture or any other suitable architecture. Note also that certain embodiments of communication system 100 are not necessarily intended to replace existing backup LSP testing procedures. Additionally, although communication system 100 has been illustrated with reference to particular elements and operations that facilitate the communication process, these elements and operations may be replaced by any suitable architecture or process that achieves the intended functionality of communication system 100.

What is claimed is:

1. A method, comprising:
communicating a first request message to a first network element functioning as a point of local repair for a backup label switched path, wherein the first request message includes a first identifier associated with the point of local repair and a second identifier associated with the backup label switched path; and
receiving a first reply message from the first network element, the first reply message including at least one first backup path parameter associated with the backup label switched path.

2. The method of claim 1, wherein the first identifier includes a first network address.

3. The method of claim 2, wherein the first network address is a point of local repair address associated with the first network element.

4. The method of claim 1, wherein the second identifier includes a forwarding equivalence class associated with the backup label switched path.

5. The method of claim 1, wherein the first request message is an echo request message, and wherein the first identifier and the second identifier are included in a Time-Length-Value field of the echo request message.

6. The method of claim 1, wherein the first reply message is an echo reply message, and wherein the at least one first backup path parameter is included within a Time-Length-Value field of the echo reply message.

7. The method of claim 1, wherein the at least one first backup path parameter includes one or more of a backup downstream address associated with a second network address associated with a backup downstream network element, a point of local repair address associated with the first network element, a backup path label associated with the backup label switched path, and a backup label switched router label associated with the backup downstream network element.

8. The method of claim 1, further comprising:
communicating a second request message to the first network element; and
receiving a second reply message from at least one second network element, the second reply message including an indication of a health of the backup label switched path.

9. The method of claim 8, wherein the second request message includes one or more second backup path parameters.

10. The method of claim 9, wherein the one or more second backup path parameters include one or more of a point of local repair address label associated with the first network element, a non-NULL label associated with the downstream network element, and a backup path label associated with the backup label switched path.

11. Logic encoded in one or more non-transitory media that includes code for execution and when executed by a processor operable to perform operations comprising:
communicating a first request message to a first network element functioning as a point of local repair for a backup label switched path, wherein the first request message includes a first identifier associated with the point of local repair and a second identifier associated with the backup label switched path; and
receiving a first reply message from the first network element, the first reply message including at least one first backup path parameter associated with the backup label switched path.

12. The media of claim 11, wherein the first identifier includes a first network address.

13. The media of claim 12, wherein the first network address is a point of local repair address associated with the first network element.

14. The media of claim 11, wherein the second identifier includes a forwarding equivalence class associated with the backup label switched path.

15. The media of claim 11, wherein the first request message is an echo request message, and wherein the first identifier and the second identifier are included in a Time-Length-Value field of the echo request message.

16. The media of claim 11, wherein the first reply message is an echo reply message, and wherein the at least one first backup path parameter is included within a Time-Length-Value field of the echo reply message.

17. The media of claim 11, wherein the operations further comprise:
communicating a second request message to the first network element; and
receiving a second reply message from at least one second network element, the second reply message including an indication of a health of the backup label switched path.

18. An apparatus, comprising:
a memory element configured to store data,
a processor operable to execute instructions associated with the data, and
a test module, the test module being configured to:
communicate a first request message to a first network element functioning as a point of local repair for a backup label switched path, wherein the first request message includes a first identifier associated with the point of local repair and a second identifier associated with the backup label switched path; and
receive a first reply message from the first network element, the first reply message including at least one first backup path parameter associated with the backup label switched path.

19. The apparatus of claim 18, wherein the first identifier includes a first network address.

20. The apparatus of claim 19, wherein the first network address is a point of local repair address associated with the first network element.

21. The apparatus of claim 18, wherein the second identifier includes a forwarding equivalence class associated with the backup label switched path.

22. The apparatus of claim 18, wherein the first request message is an echo request message, and wherein the first identifier and the second identifier are included in a Time-Length-Value field of the echo request message.

23. The apparatus of claim 18, wherein the first reply message is an echo reply message, and wherein the at least one first backup path parameter is included within a Time-Length-Value field of the echo reply message.

24. The apparatus of claim 18, wherein the test module is further configured to:
communicate a second request message to the first network element; and
receive a second reply message from at least one second network element, the second reply message including an indication of a health of the backup label switched path.

* * * * *